US007316223B2

(12) United States Patent
Wakahara

(10) Patent No.: US 7,316,223 B2
(45) Date of Patent: Jan. 8, 2008

(54) DEVICE FOR DETECTING MALFUNCTION IN EVAPORATED GAS PURGING SYSTEM

(75) Inventor: Keiji Wakahara, Inazawa (JP)

(73) Assignee: Denso Corporation, Kariya, Aichi-pref. (JP)

( * ) Notice: Subject to any disclaimer, the term of this patent is extended or adjusted under 35 U.S.C. 154(b) by 77 days.

(21) Appl. No.: 11/435,838

(22) Filed: May 18, 2006

(65) Prior Publication Data

US 2006/0272400 A1 Dec. 7, 2006

(30) Foreign Application Priority Data

Jun. 2, 2005 (JP) ............................ 2005-162649

(51) Int. Cl.
*F02M 33/02* (2006.01)
*G01M 19/00* (2006.01)

(52) U.S. Cl. ...................................... 123/520; 73/118.1

(58) Field of Classification Search ................ 123/516, 123/518, 519, 520; 73/118.1, 11 A
See application file for complete search history.

(56) References Cited

U.S. PATENT DOCUMENTS 4,446,940 A * 5/1984 Sakakibara ................. 180/177
5,005,550 A * 4/1991 Bugin et al. ................ 123/520
5,183,023 A * 2/1993 Hanson ...................... 123/520
5,190,015 A * 3/1993 Nakata et al. .............. 123/520
5,216,991 A 6/1993 Iida et al.
5,269,278 A * 12/1993 Heinemann et al. ........ 123/520
5,979,418 A * 11/1999 Saruwatari et al. ......... 123/519
6,516,786 B2 * 2/2003 Krimmer et al. ........... 123/520
6,880,534 B2 * 4/2005 Yoshiki et al. .............. 123/520
6,910,467 B2 * 6/2005 Murakami et al. .......... 123/520

* cited by examiner

*Primary Examiner*—Thomas Moulis
(74) *Attorney, Agent, or Firm*—Nixon Vanderhye P.C.

(57) ABSTRACT

An evaporated gas control system mounted on an automotive vehicle includes a canister for absorbing gas evaporated from a fuel tank and a purging passage for purging the evaporated gas into an engine. The purging passage is branched out to two passages, an upstream purging passage connected to an upstream portion of a throttle valve through an upstream valve and a downstream purging passage connected to a downstream portion of the throttle valve. Malfunction of the upstream purging passage including the upstream valve is detected based on changes in pressure of the air intake passage, which are responsive to opening and closing operations of the upstream valve. Preferably, the malfunction detecting process is performed by operating the upstream valve from a fully closed state to a fully open state under the condition where the throttle valve is fully closed.

5 Claims, 4 Drawing Sheets

DEVICE FOR DETECTING MALFUNCTION IN EVAPORATED GAS PURGING SYSTEM

CROSS-REFERENCE TO RELATED APPLICATION

This application is based upon and claims benefit of priority of Japanese Patent Application No. 2005-162649 filed on Jun. 2, 2005, the content of which is incorporated herein by reference.

BACKGROUND OF THE INVENTION

1. Field of the Invention

The present invention relates to a device for detecting malfunction in a system for purging gas evaporated from a fuel tank of an automotive vehicle.

2. Description of Related Art

In a usual evaporated gas control system, fuel gas evaporated from a fuel tank is absorbed to a canister, and the absorbed gas is sucked into a downstream portion of a throttle valve by negative pressure generated in an intake air passage. In this manner, the evaporated gas absorbed to the canister is purged. JP-A-5-187332 discloses a device for detecting malfunction in the evaporated gas purging system. In this detecting device, the malfunction in the purging system is detected based on changes in an opening degree of an idle speed control valve when an opening degree of a purge control valve is compulsory changed while an engine is idling.

On the other hand, there is another type of evaporated gas control system which is used in an engine having a supercharger. In this type of engine, pressure in an air intake passage at a downstream portion of a throttle valve becomes positive when intake air is compulsorily supplied by a compressor of a supercharger. In particular, pressure at the down stream portion of the throttle valve becomes positive when the engine is operated at a high speed and under a high load. In this case, it becomes impossible to purge the evaporated gas by means of the negative pressure at the downstream portion of the throttle valve.

In order to make it always possible to purge the evaporated gas, an engine having a purging passage that is branched out to an upstream purging passage and a downstream purging passage is proposed. The upstream purging passage is connected to the upstream portion of the throttle valve, while the downstream purging passage is connected to the downstream portion of the throttle valve. When the pressure at the downstream portion of the throttle valve is positive, the evaporated gas is purged through the upstream purging passage by utilizing a small amount of negative pressure in the upstream purging passage generated by a pressure loss in an air cleaner positioned at an upstream end of the intake air passage.

Though JP-A-5-187332 discloses a device for detecting malfunction in the evaporated gas purging system having one purging passage, i.e., the downstream purging passage, it does not offer or suggest how to detect malfunction in the upstream purging passage.

SUMMARY OF THE INVENTION

The present invention has been made in view of the above-mentioned problem, and an object of the present invention is to provide a device for detecting malfunction in the evaporated gas purging system used in the engine having a supercharger, which detects malfunction in the upstream purging passage with high reliability.

In the evaporated gas purging system, fuel evaporated from a fuel tank is absorbed to a canister, and the absorbed evaporated gas is purged into an air intake passage of an engine through a purging passage. The purging passage is branched out to an upstream purging passage which is connected to an upstream portion of a throttle valve and a downstream purging passage which is connected to the downstream portion of the throttle valve. A purge control valve for opening and closing the purging passage is disposed in the purging passage. The evaporated gas is purged through the downstream purging passage when a pressure at the downstream portion of the throttle valve is negative, while it is purged through the upstream purging passage when a pressure at the downstream portion of the throttle valve is positive.

The device for detecting malfunction in the evaporated gas purging system includes a pressure sensor for detecting a pressure at the downstream portion of the throttle valve, an upstream valve for opening and closing the upstream purging passage and a microcomputer-controlled detecting system. Malfunction in the upstream purging passage including the upstream valve is detected in the following manner.

The malfunction detecting process is performed when the throttle valve is closed. First, the purge control valve and the upstream valve are closed so that only the downstream purging passage is open to the downstream portion of the throttle valve. Since, in this situation, almost no air or evaporated gas is supplied to the air intake passage, the pressure detected by the pressure sensor becomes low (PM0). Then, the upstream valve is open to supply intake air into the air intake passage through the upstream purging passage and the upstream valve. Since intake air is supplied to the air intake passage in this situation, the pressure detected by the pressure sensor becomes high (PM1) if no malfunction is involved in the upstream purging passage including the upstream valve. Therefore, it can be determined that there is no malfunction if a pressured difference between PM1 and PM0 is larger than a predetermined value. Preferably, the pressure in the air intake passage is detected once again after closing the upstream valve to obtain a closed valve pressure (PM0). PM0 and PM2 are averaged for comparing with PM1. In this manner, the malfunction is more surely detected with high reliability.

Preferably, the malfunction detecting process is carried out when the engine is operating in deceleration by cutting fuel and fully closing the throttle valve. Preferably, the upstream valve is controlled from a fully closed state to a fully opened state in the detecting process. In this manner, the malfunction can be detected with much higher reliability. An amount of intake air measured by an airflow meter may be used for detecting the malfunction in place of the pressure detected at the downstream portion of the throttle valve.

According to the present invention, the malfunction in the upstream purging passage including the upstream valve is easily and surely detected based on the pressure changes in the air intake passage responsive to opening and closing of the upstream valve. Other objects and features of the present invention will become more readily apparent from a better understanding of the preferred embodiment described below with reference to the following drawings.

DETAILED DESCRIPTION OF THE PREFERRED EMBODIMENT

Figure 1:
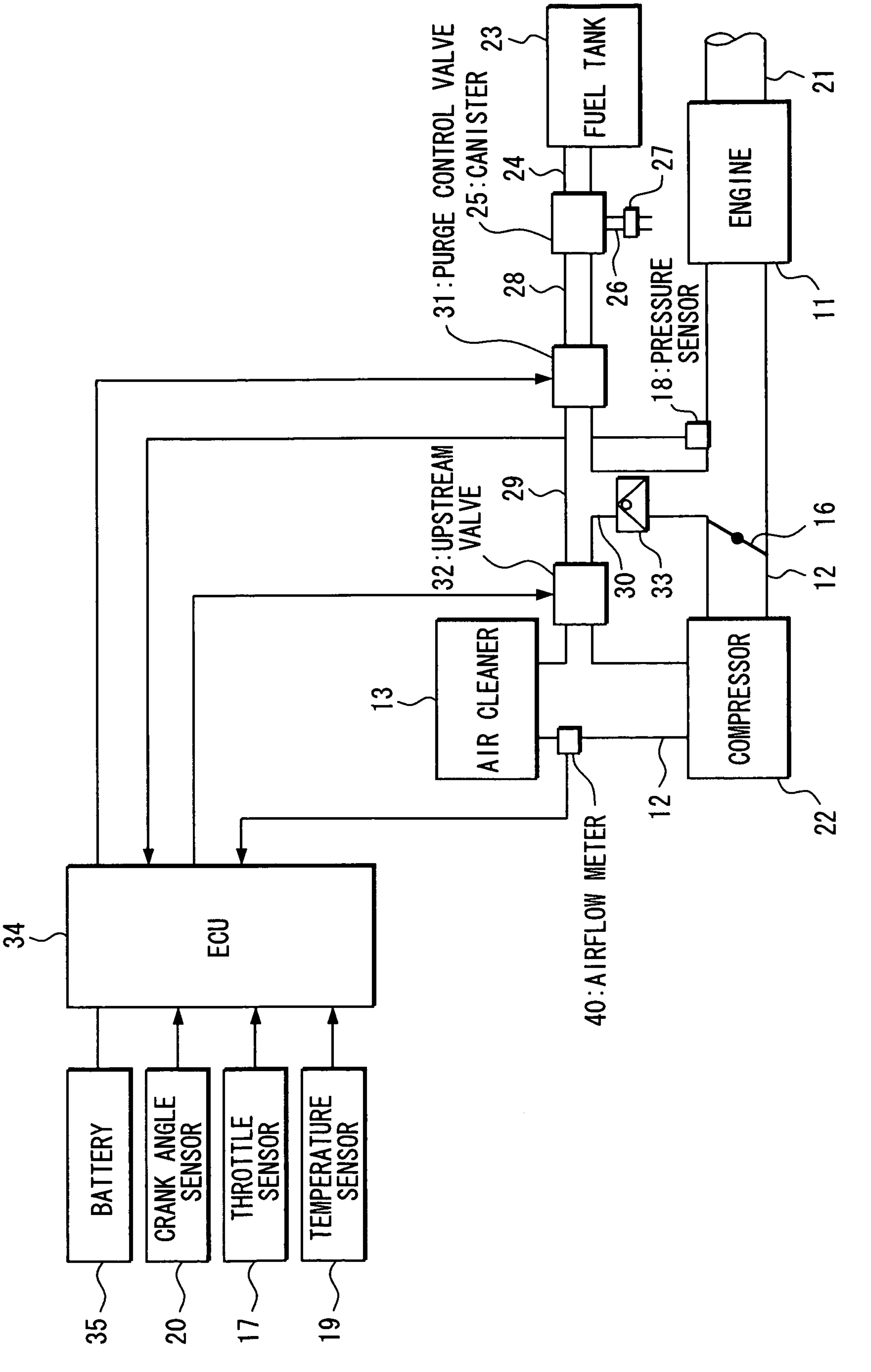
FIG. 1 is a block diagram showing an entire structure of an engine control system including an evaporated gas control system.

A preferred embodiment of the present invention will be described with reference to accompanying drawings. First, referring to FIG. 1, an entire structure of a system for controlling an engine having a supercharger will be described. At an upstream end of an air intake passage 12 of an internal combustion engine 11, an air cleaner 13 is positioned. An airflow meter 14 is disposed downstream of the air cleaner 13 in the intake air passage 12. A compressor 22 for a supercharger is disposed downstream of the airflow meter 14. A throttle valve 16 controlled by a motor and a throttle sensor 17 for detecting an opening degree of the throttle valve are disposed downstream of the compressor 22. A pressure sensor 18 for detecting pressure in the intake air passage 12 is disposed downstream of the throttle valve 16.

A temperature sensor 19 for detecting temperature of cooling water and a crank angle sensor 20 for detecting a crank angle of the engine and outputting a pulse signal at an every predetermined crank angle are installed to a cylinder block of the engine 11. A crank angle and rotational speed of the engine are detected based on the outputs of the crank angle sensor 20. The compressor 22 of the supercharger may be driven by an exhaust turbine which is in turn driven by energy of exhaust gas flowing through an exhaust pipe 21. Intake air compressed by the compressor 22 is compulsorily supplied (supercharged) to the air intake passage 12.

A canister 25 containing a material such as activated carbon for absorbing gas evaporated from fuel is connected to a fuel tank 23 through an evaporated gas passage 24. A release valve 27 for opening the canister to the atmosphere is connected to the canister 25 through an atmospheric passage 26. The release valve 27 is opened or closed by an electromagnetic valve. A purging passage 28 for purging evaporated gas to the air intake passage 12 is connected to the canister 25. The purging passage 28 is branched out, after passing through a purge control valve 31, to an upstream purging passage 29 and a downstream purging passage 30. The upstream purging passage 29 is connected to the compressor 22 through an upstream valve 32, and the downstream purging passage 30 is connected to the air intake passage 12 at a downstream portion of the throttle valve 16 through a one-way valve 33.

The purge control valve 31 disposed in the purging passage 28 is duty-controlled by an electromagnetic driver. The upstream valve 32 disposed in the upstream purging passage 29 is opened or closed by an electromagnetic driver. Alternatively, the upstream valve 32 may be duty-controlled. The one-way valve 33 disposed in the downstream purging passage 30 permits one-way flow from the purging passage 28 to the air intake passage 12, while preventing a reverse flow. A module for checking leakage in a passage from the fuel tank 23 to the purge control valve 31 may be provided.

The ECU (Electronic Control Unit) 34 is powered by a battery 35, and signals from various sensors including the temperature sensor 19, the throttle sensor 17 and the crank angle sensor 20 are fed to the ECU 34. The ECU 34 is constituted by a microcomputer and operated according to a program stored in a ROM contained therein. The ECU 34 controls an amount of fuel injected from injectors (not shown) into the engine 11 and ignition timing of spark plugs (not shown) among other things.

The ECU 34 also controls an opening degree of the purge control valve 31 according to operating conditions of the engine, so that an amount of evaporated gas purged from the canister 25 to the intake air passage 12 is controlled. In this control process, the upstream valve 32 is controlled in the following manner by performing a process shown in FIG. 4 (explained later in detail). The evaporated gas is purged into the air intake passage 12 at a downstream portion of the throttle valve 16 through the downstream passage 30 by closing the upstream valve 32 when the pressure detected by the pressure sensor 18 is negative. On the other hand, the evaporated gas is purged into the air intake passage 12 at an upstream portion of the throttle valve 16 (through the compressor 22) through the upstream purging passage 29 by opening the upstream valve 32 when the pressure detected by the pressure sensor 18 is positive. In this case, the evaporated gas is sucked into the upstream purging passage 29 by a small amount of negative pressure generated by a pressure loss in the air cleaner 13.

Figure 2:
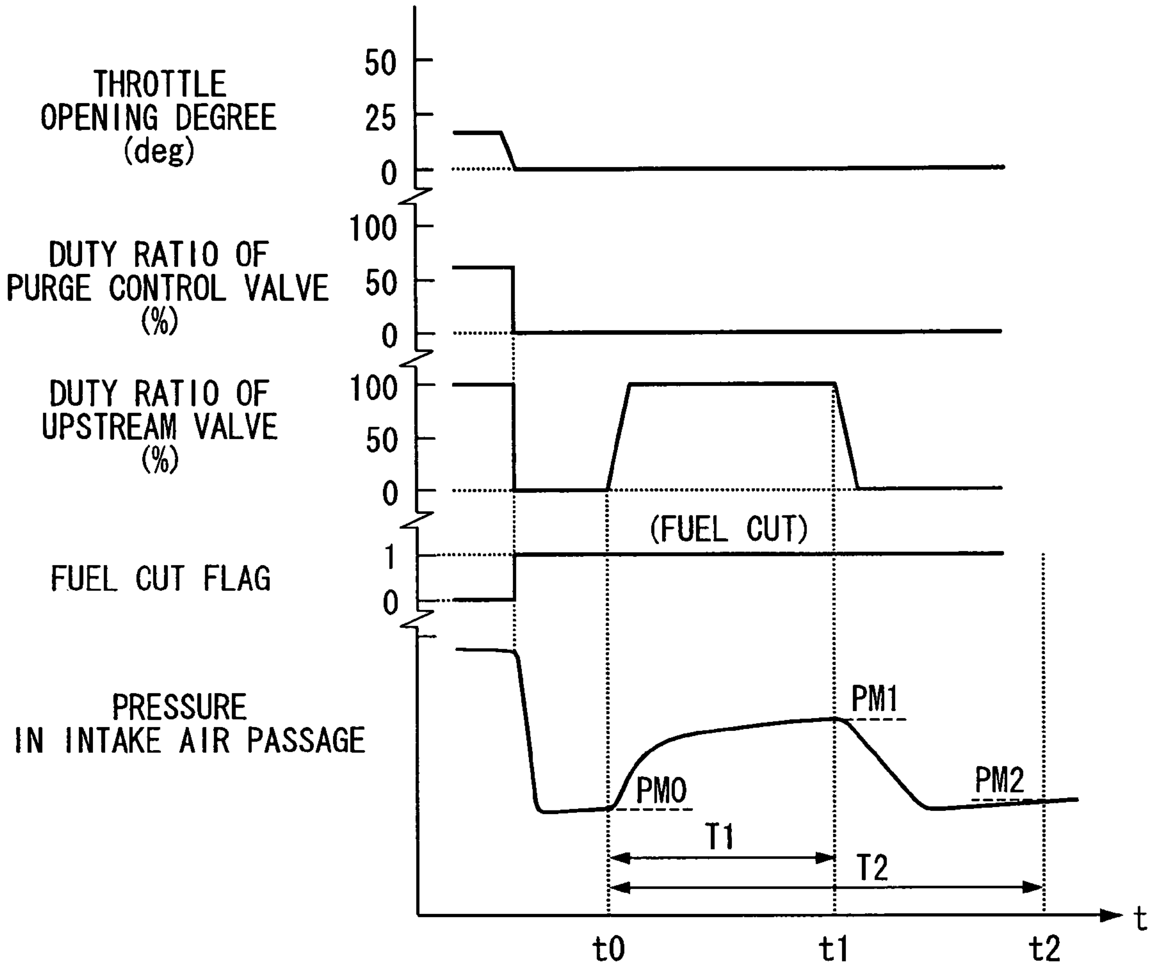
FIG. 2 is a graph showing pressure changes in an intake air passage in response to operation of a purge control valve and an upstream valve.
Figure 5:
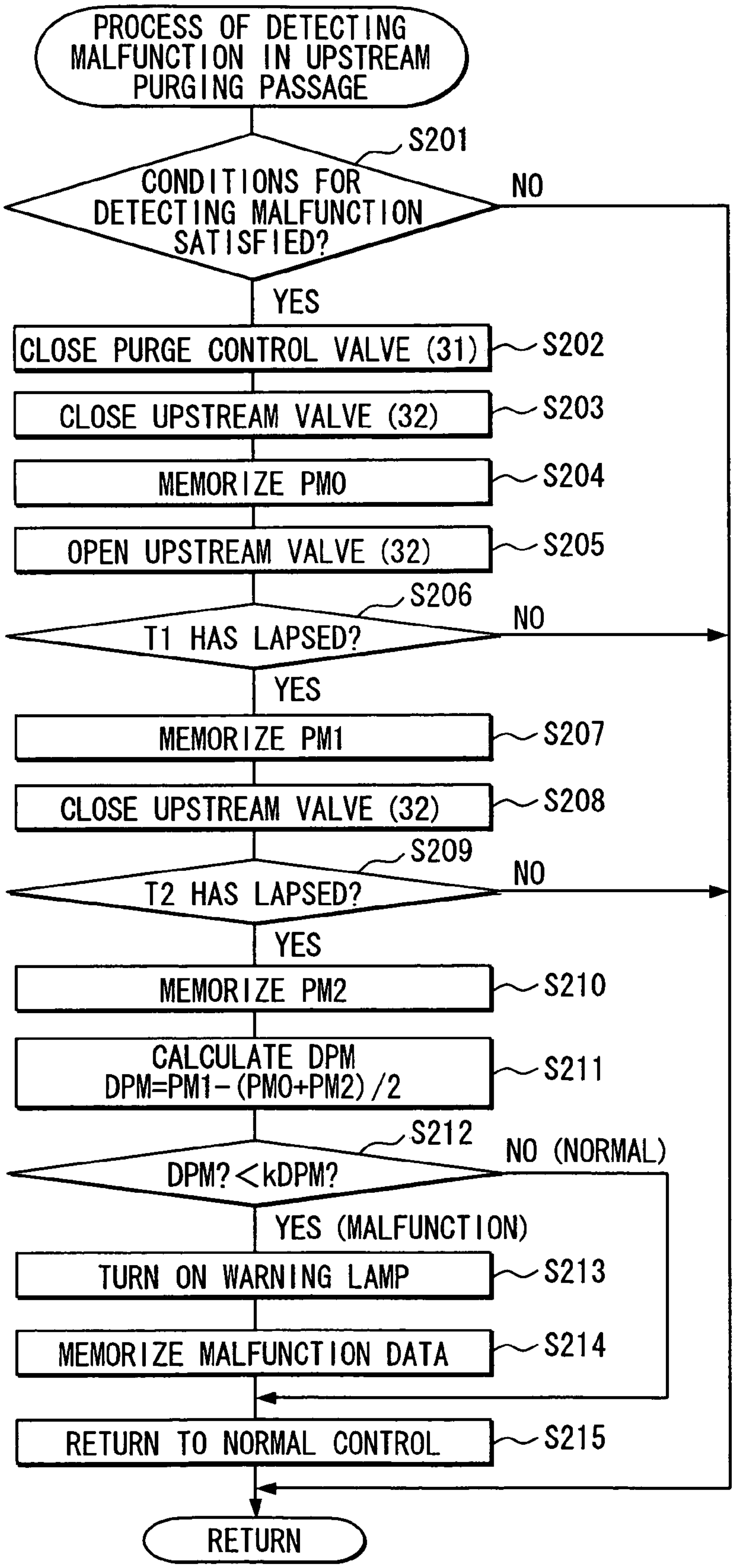
FIG. 5 is a flowchart showing a process of detecting malfunction in the upstream purging passage.

Malfunction in the upstream purging passage 29 including the upstream valve 32 is detected in a process shown in FIG. 5, which is performed by the ECU 34. Pressure changes in the air intake passage 12 in response to operation of the purge control valve 31 and the upstream valve 32 will be explained with reference to graphs shown in FIG. 2. When the throttle valve 16 is fully closed (decelerating operation by cutting fuel), both of the purge control valve 31 and the upstream valve 32 are closed. At time t0 when the pressure detected by the pressure sensor 18 has become considerably low, the pressure PM0 detected at that time is memorized as an initial pressure.

At time t0 the upstream valve 32 is opened, and the open state is maintained for a time period T1 from time t0 to time t1 (e.g., for 200 msec). During the time period T1, intake air at an upstream portion of the compressor 22 is sucked into the downstream portion of the throttle valve 16 through a bypass passage (i.e., through the open upstream valve 32, the upstream purging passage 29, the downstream purging passage 30 and the one-way valve 33). By the air flowing through the bypass passage, the pressure detected by the pressure sensor 18 increases if the upstream purging passage 29 including the upstream valve 32 is normal.

Pressure PM1 detected by the pressure sensor 18 at time t1 is memorized as an open-valve pressure. The upstream valve 32 is closed at time t1 to thereby close the bypass passage. The pressure detected by the pressure sensor 18 decreases because the air flowing through the bypass passage is shut if the upstream purging passage 29 including the upstream valve 32 is normal. Then, at time t2 when a time period T2 (e.g., 400 msec) has lapsed from the time t0, pressure PM2 detected by the pressure sensor 18 at time t2 is memorized as a closed valve poressure.

A pressure difference DPM which is caused by opening and closing the upstream valve 32 is calculated according to the following formula: DPM=PM1−(PM0+PM2)/2. That is, the pressure difference is calculated by subtracting an average of the initial pressure PM0 and the closed valve pressure PM2 from the open valve pressure PM1. By using the average of PM0 and PM2, an influence of changes in operating conditions of the engine during the malfunction detecting process on the intake air pressure can be minimized. In the case where the malfunction detecting process is performed during a period in which the operating conditions of the engine are stable, it is possible to use either PM0 or PM2 in place of the average of both values.

The pressure at the downstream portion of the throttle valve 16 detected by the pressure sensor 18 becomes considerably low during a period of decelerating operation by cutting fuel. Therefore, when the upstream valve 32 is opened in this period, intake air is sucked by the vacuum pressure through the bypass passage (through the upstream purging passage 29, the downstream purging passage 30 and the one-way valve 33). The pressure in the air intake passage 12 detected by the pressure sensor 18 becomes high as shown in the bottom graphs of FIG. 2 if there is no malfunction in the upstream purging passage 29 including in the upstream valve 32, i.e. if there is no clogging or disconnection in the passage. Accordingly, the pressure difference DPM becomes large if there is no malfunction in the upstream purging passage 29 including the upstream valve 32.

Figure 3:
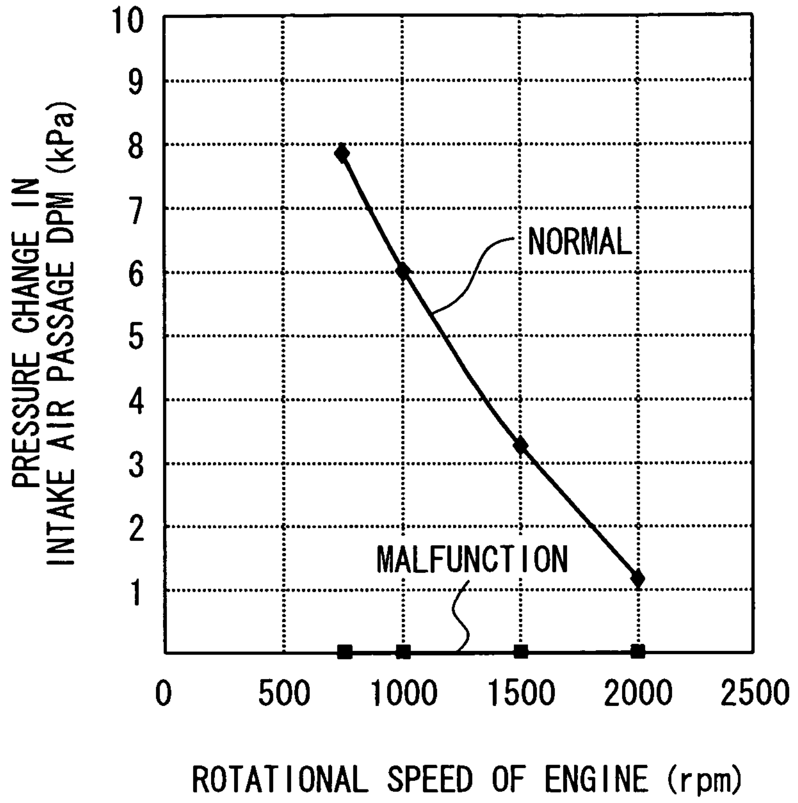
FIG. 3 is a graph showing a pressure change DPM in the intake air passage relative to rotational speed of an engine.

As shown in FIG. 3, the amount of the pressure difference DPM changes according to rotational speed of the engine when there is no malfunction in the upstream purging passage. On the other hand, the pressure difference DPM is extremely low or almost zero when there is malfunction in the upstream purging passage. Accordingly, the malfunction is surely detected based on the pressure difference DPM. Preferably, the pressure difference DPM is compared with a threshold value kDPM, and if the pressure difference DPM is lower than the threshold value kDPM, it is determined that there is malfunction in the upstream purging passage 29 including the upstream valve 32. If DPM is higher than kDPM, it is determined that the upstream purging passage 29 including the upstream valve 32 is normally functioning. The threshold value kDPM may be a constant value, or it may be changed according to rotational speed of the engine because DPM changes according to rotational speed of the engine as shown in FIG. 3.

Figure 4:
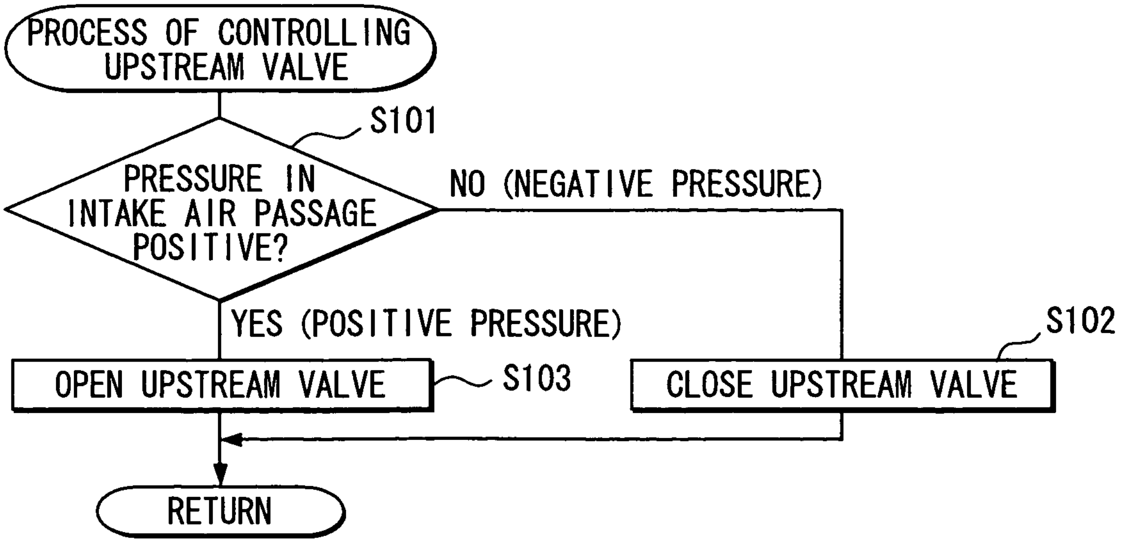
FIG. 4 is a flowchart showing a process of controlling an upstream valve in an upstream purging passage.

The process of controlling the upstream valve 32 will be explained with reference to FIG. 4. This process is repeated with a predetermined period, e.g., every 16 msec. At step S101, whether the pressure in the air intake passage 12 detected by the pressure sensor 18 is positive or not (higher than the atmospheric pressure) is checked. If the pressure is negative, the process proceeds to step S102, where the upstream valve 32 is closed to close the upstream purging passage 29. The evaporated gas is purged to the downstream portion of the throttle valve 16 through the downstream purging passage 30 by the vacuum pressure at the downstream portion of the throttle valve 16.

If the pressure detected by the pressure sensor 18 is positive, the process proceeds to step S103, where the upstream valve 32 is opened to open the upstream purging passage 29. The evaporated gas is purged to the upstream portion of the compressor 22 by a small amount of vacuum pressure generated by a pressure loss of the air cleaner 13 through the upstream purging passage 29 including the open upstream valve 32.

Now, the process of detecting malfunction in the upstream purging passage 29 including the upstream valve 32 will be explained in detail with reference to FIG. 5. This process is repeated with a predetermined period, e.g., every 16 msec. At step S201, whether all of the following conditions for detecting malfunction are satisfied or not is determined: (1) the engine is decelerating by cutting fuel and by fully closing the throttle valve 16; (2) temperature of the cooling water is within a predetermined range; (3) rotational speed of the engine is within a predetermined range; and (4) a load of the engine is within a predetermined range. If all of the conditions are satisfied, the process proceeds to step S202, and if any one of the conditions is not satisfied, the process comes to the end.

At step S202, the purge control valve 31 is closed. At step S203, the upstream valve 32 is closed. Then, at step S204, the initial pressure PM0 detected by the pressure sensor 18 is memorized. At step S205, the upstream valve 32 is opened so that the intake air flows through the bypass passage composed of the upstream valve 32, the upstream purging passage 29, the downstream purging passage 30 and the one-way valve 33. Thus, the intake air is supplied to the downstream portion of the throttle valve 16.

Then, at step S206, whether the predetermined period T1 (e.g., 200 msec) has lapsed after the upstream valve 32 is opened at time t0 is checked. When the predetermined period T1 has lapsed (at time t1), the process proceeds to step S207, where the open valve pressure PM1 detected by the pressure sensor 18 is memorized. At step S208, the upstream valve 32 is closed to stop the intake air supply to the downstream portion of the throttle valve 16 through the bypass passage. Then, at step S209, whether the predetermined period T2 (e.g., 400 msec) has lapsed from time t0 is checked. When the predetermined period T2 has lapsed (at time t2), the process proceeds to step S210, where the closed valve pressure PM2 detected by the pressure sensor 18 is memorized.

At step S211, the pressure difference DPM is calculated according to the formula: DPM=PM1−(PM0+PM2)/2. Then, at step S212, whether the pressure difference DPM is lower than the threshold value kDPM is determined. If the DPM is lower than kDPM, it is determined that there is malfunction in the upstream purging passage 29 including the upstream valve 32, and the process proceeds to step S213, where a warning is given to a driver, by a warning sound or a display on a display panel. At step S214, data showing the malfunction are memorized in a rewritable memory such as a backup RAM in the ECU 34, and the process proceeds to step S215, where operation of the purge control valve 31 and the upstream valve 32 is returned to a normal control. Then, the process comes to the end. If DPM is not lower than kDPM (at step S212), it is determined that the upstream purging passage 29 including the upstream valve 32 is normally functioning, and the process proceeds to step S215, where operation of the purge control valve 31 and the upstream valve 32 is returned to a normal control. Then, the process comes to the end.

Advantages of the present invention will be summarized below. The upstream valve 32 is positioned in the upstream purging passage 29, and the malfunction in the upstream passage 29 including the upstream valve 32 is detected based on the pressure difference DPM obtained by opening and closing the upstream valve 32 while the purge control valve 31 is kept closed. Therefore, the malfunction, such as clogging of the upstream purging passage 29, disconnection of pipes or defects in the upstream valve 32, can be easily and quickly detected with high reliability.

The process of detecting the malfunction is performed during the decelerating operation of the engine while cutting fuel supply. The pressure difference DPM obtained by opening and closing the upstream valve 32 becomes large under such operating condition of the engine. Therefore, the malfunction is surely detected. Further, drivability of the engine is not much affected by closing and opening operation of the upstream valve 32 under such operating conditions of the engine.

The malfunction detecting process is carried out while the purge control valve 31 is closed. Therefore, the evaporated gas is not purged to the downstream portion of the throttle valve 16 through the downstream purging passage 30 during the detecting process, thereby enhancing reliability in the detection of the malfunction in the upstream purging passage. It is possible to perform the detecting process while closing the release valve 27 in place of the purge control valve 31. Since the upstream valve 32 is controlled between a fully closed state and a fully opened state, it is possible to make the amount of pressure difference DPM large, thereby making the detection reliability high.

The present invention is not limited to the embodiment described above, but it may be variously modified. For example, the upstream valve 32 may be controlled to predetermined plural opening degrees in the process of detecting malfunction. Though the malfunction is detected by comparing the pressure difference DPM with the threshold value kDPM in the foregoing embodiment, it is possible to use other ways. For example, the malfunction may be detected by comparing a ratio of PM1 to PM0 or PM2 with a predetermined ratio. A changing speed in the pressure detected by the pressure sensor 18 in response to the opening and closing operation of the upstream valve 32 may be used for detecting malfunction.

Though the malfunction detecting process is performed during the decelerating operation by cutting fuel supply in the foregoing embodiment, it is possible to perform the detecting process during idling operation of the engine or during a period in which the throttle valve 16 is fully closed.

It is also possible to carry out the detection process when the engine is operated under a light load and the pressure in the air intake passage is negative. Further, it is also possible to detect the malfunction in the upstream purging passage based on the pressure detected by the pressure sensor 18 while the pressure at the downstream portion of the throttle valve 16 is positive. In this case, air from the canister side flows to the upstream portion of the compressor 22 by a small amount of vacuum at the upstream portion of the compressor 22 through the upstream purging passage 29 when the upstream valve 32 is opened. An amount of such air varies according to an opening degree of the upstream valve 32, and thereby the pressure detected by the pressure sensor 18 also varies.

Though the malfunction in the upstream purging passage is detected based on the pressure in the air intake passage detected by the pressure sensor in the foregoing embodiment, the malfunction may be detected based on an amount of air detected by the airflow meter 14. The present invention may be applied to engines having a supercharger other than the turbocharger. The supercharger may be a mechanically driven supercharger.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A device for detecting malfunction in an evaporated gas purging system for an internal combustion engine having a supercharger for supplying intake air to an upstream portion of a throttle valve, the evaporated gas purging system including a purging passage that is branched out to an upstream purging passage connected to the intake air passage at an upstream portion of the throttle valve and a downstream purging passage connected to the intake air passage at an downstream portion of the throttle valve, the malfunction detecting device comprising:

a pressure sensor for detecting a pressure in the intake air passage at the downstream portion of the throttle valve;

an upstream valve for opening and closing the upstream purging passage; and means for detecting malfunction in the upstream purging passage including the upstream valve based on changes in the pressure detected by the pressure sensor in response to changes in an opening degree of the upstream valve.

2. The detecting device as in claim 1, wherein:

the malfunction in the upstream purging passage including the upstream valve is detected under an engine operating state where at least one of the following conditions is satisfied: decelerating operation by cutting fuel supply; idling operation; and operation by fully closing the throttle valve.

3. The detecting device as in claim 2, further comprising at least either one of a purge control valve for opening and closing the purging passage at a position before the purging passage branches out to the upstream purging passage and the downstream purging passage and a release valve for opening the evaporated gas purging system to the atmosphere, wherein:

the malfunction in the upstream purging passage including the upstream valve is detected while the purge control valve or the release valve is closed.

4. The detecting device as in claim 1, wherein:

the malfunction in the upstream purging passage including the upstream valve is detected based on changes in the pressure detected by the pressure sensor in response to opening and closing the upstream valve.

5. A device for detecting malfunction in an evaporated gas purging system for an internal combustion engine having a supercharger for supplying intake air to an upstream portion of a throttle valve, the evaporated gas purging system including a purging passage that is branched out to an upstream purging passage connected to the intake air passage at an upstream portion of the throttle valve and a downstream purging passage connected to the intake air passage at an downstream portion of the throttle valve, the malfunction detecting device comprising:

an airflow meter for detecting an amount of air supplied to the intake air passage of the engine;

an upstream valve for opening and closing the upstream purging passage; and means for detecting malfunction in the upstream purging passage including the upstream valve based on changes in the amount of air detected by the airflow meter in response to changes in an opening degree of the upstream valve.

* * * * *